United States Patent
Mares

(10) Patent No.: US 9,586,177 B2
(45) Date of Patent: Mar. 7, 2017

(54) PROCESS FOR REMOVING SULFUR COMPOUNDS FROM A GAS WITH HYDROGENATION AND DIRECT OXIDATION STEPS

(71) Applicant: PROSERNAT, Puteaux (FR)

(72) Inventor: Benoit Mares, Montesson (FR)

(73) Assignee: PROSERNAT, Puteaux (FR)

(*) Notice: Subject to any disclaimer, the term of this patent is extended or adjusted under 35 U.S.C. 154(b) by 28 days.

(21) Appl. No.: 14/688,067

(22) Filed: Apr. 16, 2015

(65) Prior Publication Data

US 2016/0263524 A1    Sep. 15, 2016

(30) Foreign Application Priority Data

Mar. 12, 2015 (EP) .................... 15158886

(51) Int. Cl.
*C01B 17/04* (2006.01)
*B01D 53/86* (2006.01)

(52) U.S. Cl.
CPC ..... *B01D 53/8612* (2013.01); *B01D 53/8615* (2013.01); *C01B 17/0439* (2013.01); *C01B 17/0469* (2013.01); *B01D 2255/2092* (2013.01); *B01D 2255/20707* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/65* (2013.01); *B01D 2255/702* (2013.01); *B01D 2255/904* (2013.01); *B01D 2255/9032* (2013.01); *B01D 2257/306* (2013.01); *B01D 2257/308* (2013.01)

(58) Field of Classification Search
CPC ... C01B 17/04; C01B 17/046; C01B 17/0469; C01B 17/0473; C01B 17/0491
See application file for complete search history.

(56) References Cited

U.S. PATENT DOCUMENTS

| | | | | |
|---|---|---|---|---|
| 5,676,921 | A * | 10/1997 | Heisel | B01D 53/8612 423/224 |
| 2008/0279758 | A1* | 11/2008 | Chow | B01D 53/8603 423/564 |
| 2008/0311030 | A1* | 12/2008 | Boll | B01D 53/8615 423/576.2 |
| 2009/0226354 | A1* | 9/2009 | Rameshni | B01D 53/8615 423/244.04 |

* cited by examiner

*Primary Examiner* — Timothy Vanoy
(74) *Attorney, Agent, or Firm* — Millen, White, Zelano and Branigan, P.C.

(57) ABSTRACT

A process for removing sulfur from a gas containing sulfur compounds as H2S, SO2, COS, CS2 . . . , in a quantity of up to 15% wt; particularly gases emanating from the Claus process: A first hydrogenation of the sulfur compounds into H2S, the hydrogenation gas being used to regenerate a deactivated bed of oxidation catalyst, both being carried out at 200-500° C. After sulfur removal, the resulting gas undergoes a second hydrogenation step and then a direct oxidation step, said step being operated under the dew point of sulfur to trap the formed sulfur in the catalyst. In the further cycle, the gas streams are switched so as to regenerate the catalyst in run which is deactivated.

13 Claims, 2 Drawing Sheets

PROCESS FOR REMOVING SULFUR COMPOUNDS FROM A GAS WITH HYDROGENATION AND DIRECT OXIDATION STEPS

The present invention relates to a process for the removal of sulfur compounds as SO2, COS, CS2 and/or H2S and sulfur recovery from a gas stream containing up to 15% vol. (expressed as H2S) of sulfur species.

The presence of sulfur in industrial gases causes significant environmental problems and therefore, strict requirements are in place to remove sulfur from gas streams, in particular in petroleum refinery and natural gas plants but also in biogas plants, from H2S scrubbers, etc. . . .

Sulfur recovery units are thus installed to convert poisonous sulfur compounds, as H2S into harmless elemental sulfur.

A widespread method for desulfurization of sulfur-containing gas streams, in particular from gas streams in petroleum refineries and natural gas plants is the Claus process.

However gases emanating from the Claus process still contain sulfur compounds, mainly H2S and SO2, few amounts of COS, CS2 and high quantities of water (for example 25-35% vol.) diluted in a stream containing possibly CO2 and/or inert (mainly nitrogen).

The constant evolution of regulations word-wide towards a better control of SO2 emissions makes it necessary to keep improving the performance of sulfur recovery processes.

PRIOR ART

Sulfreen and Doxosulfreen processes have been developed for improving sulfur recovery.

In the Sulfreen process, the main catalytic reaction involved is the Claus reaction:

$$2H_2S + SO_2 \rightarrow ; \leftarrow 3/nS_n + 2H_2O$$

The reaction is exothermic and, at low temperatures, is displaced towards the formation of sulfur. In fact, it has been proven that operating below the dew point of sulfur with adequately structured catalyst was increasing the product yield by taking advantage of capillary condensation within the pores: enhancement of the formation of sulfur due to the subsequent shift of equilibrium and decrease of sulfur losses in the vapor phase. The thermodynamic limitation of the Claus equilibrium does not allow sulfur recoveries higher than 99.5 to 99.6%.

Because of the operating temperature range, the sulfur formed by the catalytic reaction builds up within the porous network of the catalyst, and further has to be removed by increasing the temperature in such a way that the sulfur is vaporized and is recovered through a condenser.

Consequently, the process consists in a continuous treatment involving the implantation of at least two reactors, each containing solely at least one catalytic bed of Claus catalyst, operating alternatively: one reactor being under the adsorption-reaction mode below sulfur dew point, while in the other reactor the catalyst regeneration takes place at about 300° C.

The DoxoSulfreen process operates according to another route which is direct oxidation at temperatures below the sulfur dew point, generally below 140° C. The reaction involved is:

$$H_2S + \tfrac{1}{2}O_2 \rightarrow ; \leftarrow 1/nS_n + H_2O$$

However the reaction is exothermic. According to thermodynamic calculations, the selective direct oxidation of H2S into sulfur of a tail gas containing 0.5% vol. H2S would lead to a temperature increase of 35° C. under adiabatic conditions (i.e. without cooling). Thus, usually a gas issued from Claus units also contains high quantities of water which generally condensate for temperatures below 90-95° C. which can cause high corrosion. Corrosion is unwanted and determines the minimal temperature of operation. The treatment of such a gas would result in an operating temperature level of order of 125-130° C. The thermodynamically stable product resulting from the oxidation of H2S by air in the considered temperature range is SO2 and experience confirmed that the yield of SO2 is increasing dramatically with the temperature. So 140° C. is a maximum temperature of operation in order to limit/avoid SO2 formation. For this reason, DoxoSulfreen process is generally limited by a maximum H2S content at the inlet of about 5000 ppmv.

In order to operate in a convenient temperature range, the process should be located downstream a sulfur treatment which can result in the maximum 5000 ppmv H2S, this arrangement needs to be an implementation of an upstream tail gas treatment process (Sulfreen process for example) so as to minimize the H2S inlet of DoxoSulfreen process, thus increasing the overall cost of the sulfur recovery unit substantially.

Concerning SO2, COS and/or CS2 conversion to H2S and oxidation into sulfur, several processes have been developed.

A process described in U.S. Pat. No. 8,703,084, involves hydrolysis of COS and/or CS2 by water, without hydrogenation and in the absence of hydrogen. Water is added to the gas to be treated and the reaction occurs at temperatures of 150-400° C., at pressures from atmospheric pressure to 35 bars (500 psig). The catalyst is chosen among Al2O3, TiO2, Cu/Al2O3, CoMo/Al$_2$O$_3$. The gases obtained after hydrolysis pass over an oxidation catalyst at a temperature above the sulfur dew point.

Another process described in FR-2762592, involves hydrolysis of COS and/or CS2 before the Sulfreen process.

In EP-801633, the process for removal of 0.7 to 3% vol. H2S consists in a direct catalyst oxidation of H2S to sulfur at temperatures lower than the sulfur dew point in the presence of injection of oxygen, sulfur formed is deposited in the catalyst bed and a purified gas exits the last bed. The gas entering in each bed is at a temperature of 80-100° C., the quantity of oxygen being sub-stoichiometric with respect to the quantity of H2S. However, in the last bed oxygen is in excess and the temperature does not exceed 130° C., the temperature can be obtained by cooling the catalyst with an indirect fluid exchanger. The catalytic beds are regenerated by passage of a non-oxidizing hot gas (methane, nitrogen, CO2, or a fraction of the gas to be treated) on the catalytic beds, at 200-500° C. to vaporize sulfur. Sulfur is then trapped by cooling, condensation and is withdrawn.

Before being oxidized, the gas can undergo an hydrogenation/hydrolysis step to convert sulfur compounds as SO2, CS2, COS to H2S, over an hydrogenation catalyst at a temperature of 140-550° C.

Hydrogen can be added from an external source or can be produced by a fuel burner operating below stoichiometry, hydrogen, CO and water are thus present in the combustion gases added to the gas to be processed.

Even if the different prior art processes allow sulfur recovery as high as 99.9%, there is still a need for a process having the same level of performance which allows:

considering a stream containing over 5000 ppm equivalent H2S, and preferably up to 15% vol. equivalent H2S, a reduction, and preferably elimination, of water condensation in the reactors to limit corrosion and/or catalyst damages, reduction of SO2 production, an improvement in the control of the temperature in each bed of oxidation catalyst and a simplification of the working, adequation to flowrate fluctuations, as the catalyst needs to be able to keep selective within a wide range of retention times. Moreover, it would be of interest that it would not rely sharply on ratio adjustment as it is the case with the Claus equilibrium, and should keep efficient and selective within a wide range of air to H2S ratio.

The present invention brings a solution to these problems/limitations.

SUMMARY OF THE INVENTION

More precisely, the invention concerns a process for the removal of sulfur compounds contained in a gas to be processed containing up to 15% volume of sulfur compounds expressed as H2S, said process comprising:

1) a first hydrogenation step of said sulfur compounds into H2S, in the presence of hydrogen over an hydrogenation catalyst, the gas entering at a temperature of 200-320° C., and more preferably of 250 to 280° C.,
2) direct oxidation of H2S into elemental sulfur in the presence of oxygen over a direct oxidation catalyst, at a controlled temperature below the sulfur dew point, elemental sulfur deposits in the catalyst bed and a purified gas is obtained,
3) regeneration of the deactivated direct oxidation catalyst, said regeneration being carried out in-situ by the passage of a hot gas at a temperature above the sulfur dew point, the temperature being generally of 200-500° C., often 250-350° C., then cooling the obtained gas, generally at 122 to 170° C., condensation and separation of elemental sulfur, an elemental sulfur depleted gas and a regenerated catalyst are obtained, wherein the direct oxidation is carried out at temperatures generally ranging from 20 to 180° C., preferably 80-180° C. and more preferably from 110 to 140° C., regeneration is carried out by the passage of the hot gas issued from the first hydrogenation step, generally at a temperature of 200 to 500° C., and more generally from 250 to 350° C., the elemental sulfur depleted gas undergoes a second hydrogenation step in the presence of hydrogen over an hydrogenation catalyst, the gas entering at a temperature of 122 to 320° C., and direct oxidation of the obtained gas.

Preferably, the temperature of the oxidation catalyst bed is controlled by indirect contact with a cooling element. Preferably the temperature is controlled by an internal cooling, for example with an internal heat exchanger as a thermoplates heat exchanger embedded in the catalytic bed.

Obviously, during regeneration of the catalyst, cooling is stopped or at least strongly reduced.

Generally, hydrogenation steps operate without cooling.

Hydrogen is preferably produced on-site by a reducing gas generator (RGG) fed with natural gas and air in sub-stoichiometric quantity.

In a preferred embodiment, the process is carried out in at least 2 identical reactors operating in downflow, each comprising:

at the top of the reactor, a first zone of at least one catalytic bed of an hydrogenation catalyst, receiving a gas containing hydrogen, followed by a second zone of a direct oxidation catalyst bed, said bed being separated from the hydrogenation catalyst bed, comprising an internal cooling, preferably an embedded heat exchanger as an embedded thermoplates heat exchanger, and between the first zone and the direct oxidation zone, and before entering in the direct oxidation zone, an injection of an oxygen-containing gas, said injection being activated only during the oxidation reaction, and the process operates as following:

the first reactor receiving the gas to be treated is at a temperature of 200-500° C. (called hot mode), the first hydrogenation reaction takes place in the first zone and the regeneration reaction takes place in the second zone, the gas withdrawn from the second zone of the first reactor entering in the first zone of the second reactor is at a temperature of 122 to 320° C. and the second hydrogenation step takes place, the gas from the first zone of the second reactor, optionally cooled, flows in the second zone of the second reactor where the direct oxidation takes place, the temperature is maintained at a temperature below the sulfur dew point (called cold mode), and a purified gas exits, prior to the deactivation of the oxidation catalyst of the second reactor, the gas steams are switched such that the second reactor becomes the first reactor operating in hot mode, and the first reactor becomes the second reactor operating in cold mode.

DESCRIPTION

The sulfur compounds contained in the gas to be treated are mainly H2S and few quantities of elemental sulfur vapors, SO2, COS and/or CS2. The gas may contain high quantity of water especially in the case of residual gases from Claus units, for example 25-35% vol. Generally, the gas contains from 0.1 to 3% vol. (expressed as H2S) of sulfur compounds, but with the present invention the sulfur content can reach a content as high as 6% vol. or even 15% vol.

The first step of the process is the hydrogenation step. Before entering into this step, hydrogen is added to the gas to be treated.

The quantity of hydrogen in the feed (gas to be treated +H2) is preferably equal or higher than the stoichiometry. Generally, the quantity of H2 is added in an excess in the flow of gas to be treated. The hydrogen flow is generally controlled by the measure of an analyzer downstream the process (after hydrogenation steps) in order that about 1 to 5% vol of H2 remains.

In a preferred embodiment, hydrogen is produced on-site with the gas to be treated, as the tail gas coming from the Claus unit. The tail gas is heated up in a reducing gas generator (RGG) which purpose is to heat the process gas using fuel gas combustion in a slight sub-stoichiometric combustion. For example, natural gas and oxygen-containing gas in sub-stoichiometric quantity are introduced in the combustion chamber and H2 is produced. Gases so-obtained are then mixed with the gas to be treated, as the tail gas. The outlet temperature of the process gas from RGG is between 250 and 320° C. If necessary, external H2 (from external source) can be added.

In another embodiment, H2 is provided from the on-site utilities.

In others words, the process according to the invention is carried out in at least two separated direct oxidation zones, one (or several) being under reaction in the present cycle whilst the deactivated catalyst (second zone) is regenerated, said catalyst being issued from the zone previously under reaction in the previous cycle, the process operating with the following successive steps:
1) the feed (gas to be treated containing sulfur compounds+H2) undergoes a first hydrogenation step of said sulfur compounds into H2S, in the presence of hydrogen over an hydrogenation catalyst, the gas entering at a temperature of 200-320° C., and more preferably of 250 to 280° C.,
2) regeneration of the direct oxidation catalyst deactivated in the previous cycle, said regeneration being carried out in-situ by the passage of the hot gas issued from the first hydrogenation step, at a temperature above the sulfur dew point, generally at a temperature of 200 to 500° C., and more generally from 250 to 350° C., then cooling the obtained gas, generally at 122 to 170° C., condensation and separation of elemental sulfur, and an elemental sulfur depleted gas and a regenerated catalyst are obtained,
3) a second hydrogenation step of the elemental sulfur depleted gas in the presence of hydrogen over an hydrogenation catalyst, the gas entering at a temperature of 122 to 320° C.,
4) direct oxidation of H2S into elemental sulfur in the presence of oxygen over a direct oxidation catalyst, at a controlled temperature below the sulfur dew point, generally ranging from 20 to 180° C., preferably 80-180° C. and more preferably from 110 to 140° C., elemental sulfur deposits in the catalyst bed and a purified gas is obtained.

First Hydrogenation Step (Operating in Hot Mode):

Before being sent to the first step, the feed could have been heated.

The first step operates with an hydrogenation catalyst and at a temperature such that the sulfur compounds (SO2, COS, CS2 . . . ) are transformed into H2S (hydrogenation and hydrolysis). Typical temperatures of entrance of the gas are ranging between 200-320° C., more often between 200-280° C. or 250-280° C. The first hydrogenation step operates in the so-called hot mode.

The quantity of H2 is determined such as to be sufficient to obtain the total hydrogenation of the sulfur compounds which could be hydrogenated. Generally, this step operates in the presence of an excess of hydrogen of about 1 to 5% vol. of the total stoichiometric quantities of components to be hydrogenated. Hydrogen quantity (excess) is controlled by analyzer downstream the process.

At the outlet of the first zone, preferably the H2S content ranges between few ppm up to 15% vol., depending on the sulfur compounds content in the feed.

Hydrogenation catalysts are well-known. They contain a support (as alumina, silica . . . , preferably alumina) and a group VIII element (preferably a non-noble element, and preferably Ni and/or Co) and preferably a group VI element (preferably Mo and/or W). Generally, the hydrogenation catalyst comprises a GVIII and a GVIB element deposited on alumina. A preferred catalyst contains or consists in Co and Mo deposited on alumina. The amounts of elements are ranging between 1-10% wt of GVIII element (calculated as oxides) and 5-40% wt of GVIIB element (calculated as oxides).

The first step is generally not cooled (adiabatic); there is generally no internal cooling of the hydrogenation catalytic bed; so, exothermicity can develop.

The hot gas issued from the first hydrogenation step has a temperature above the entrance temperature and is generally between 200 to 500° C., and more generally from 250 to 350° C., or 280-350° C.

A benefit of the invention is to take advantage of the heat of this hot gas to regenerate (i.e. to desorb sulfur deposited) the deactivated oxidation catalyst, the temperature of the hot gas being above the sulfur dew point.

Regeneration of the Deactivated Direct Oxidation Catalyst (in Hot Mode) and Sulfur Recovery:

in a continuous process, the oxidation reaction is carried out in at least 2 separated oxidation zones in parallel, so that when one (or several) is under regeneration, the other (or several) is in operation. The catalyst in process is slowly deactivated by the sulfur deposit. Before its total deactivation, it will be regenerated in the next cycle by switching the reactor from one operating mode (previous oxidation COLD mode) to the second one (previous regeneration HOT mode). Before regeneration, the oxygen injection is stopped.

Regeneration is carried out in-situ. The hot gas emanating from the first hydrogenation step at a high temperature reached by the exothermic reaction, generally between 200 to 500° C., and more often from 250 to 350° C., or 280-350° C. passes over the catalyst.

Temperatures are above the sulfur dew point (depending on the S content and the operating conditions). Sulfur is desorbed.

A stream of gas is obtained which contains H2S, remaining H2, optionally few remaining non hydrogenated sulfur compounds possibly issued from the regeneration step, elemental sulfur vapors and possibly SO2 emanation which could be associated to the regeneration step.

The obtained gas is then cooled, at a temperature allowing sulfur to condense, that is below the sulfur dew point, usually from 122 to 170° C., and liquid sulfur is separated from the gases. An elemental sulfur depleted gas and a regenerated catalyst are obtained.

Second Hydrogenation Step:

The elemental sulfur depleted gas is sent to the second hydrogenation step, optionally after being heated if necessary.

The hydrogenation catalyst is the same or different as in the first hydrogenation step; preferably it is the same. The quantity/volume may be the same or different; preferably they are the same. Hydrogenation of SO2, in case of emanation from regeneration step, or any other present sulfur component which is not H2S occurs.

Sufficient hydrogen added to the gas to be treated prior entering the first hydrogenation step remains in the stream and flows with the elemental sulfur depleted gas to achieve a second hydrogenation step.

Conventional temperatures of the gas entering the first zone of the second reactor are from 122 to 320° C.

The second hydrogenation step is generally operates without cooling (adiabatic); there is generally no internal cooling of the hydrogenation catalytic bed.

Direct Oxidation Step (Operating in Cold Mode):

H2S formed in the first hydrogenation step and in the second hydrogenation step is oxidized into elemental sulfur (called direct oxidation) in the presence of oxygen over a direct oxidation catalyst.

Prior entering in the catalytic bed, an oxygen containing gas is added, preferably air. The quantity of oxygen is at least at the stoichiometric ratio defined by the direct oxidation reaction:

$$H_2S + \tfrac{1}{2}O_2 \rightarrow; \leftarrow 1/nS_n + H_2O$$

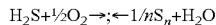

Generally, the quantity of oxygen (as $O_2$) is added in excess to the stoichiometric quantity, which is the half of the quantity of H2S. Usually the oxygen containing gas flow is controlled by the concentration of H2S measured in the treated gas and is kept below the explosive limit (about 4% vol). Conventional excess of oxygen are from 0.1 to 4% vol., preferably 1-4% vol., of the treated gas regarding to the stoichiometric quantity of components to be oxidized.

The direct oxidation catalysts are well-known. Preferred catalyst used is titanium oxide but other usual catalysts, in particular CoMo or NiMo can also be used. A further suitable catalyst is Fe but better results are achieved with TiO2, CoMo and NiMo, in particular with TiO2. Another preferred catalyst contains copper preferably supported on titanium oxide or alumina. Another type of potential catalysts have been developed with silicium carbide support, used for example in Doxosulfreen process, which includes at least an oxysulfide of a transition metal selected from Fe, Cu, Ni, Cr, Mo and W.

This direct oxidation reaction is exothermic. However temperature should be controlled below the sulfur dew point to selectively produce sulfur. Thus, the catalytic bed comprises an internal cooling.

Advantageously, this is achieved with an internal heat exchanger, preferably embedded in the catalytic bed. In a preferred embodiment, this is a well-known thermoplates heat exchanger embedded in the catalytic bed, as described for example in EP-2594328, EP-983252, EP-963247.

Thanks to the internal heat exchanger, exothermicity is controlled. The gas outlet temperature is around 20-180° C., preferably 80-180° C. and more preferably 110-140° C. The direct oxidation step operates in the so-called cold mode.

At these low temperatures, the reaction does not form significant amount of SO2 and liquid/solid sulfur accumulate on the catalyst.

Gases from the direct oxidation step meet the environmental requirements and can be sent to incineration. With the process of the invention, sulfur recovery can be as high as 99.9%.

The catalyst is slowly inactivated by the liquid or solid sulfur deposits and will be regenerated in the next cycle.

The process can operate with each step being in separated reactor.

The process operates in upflow or downflow of gas in each step. In the preferred embodiment (here after described) with 2 identical reactors, it operate in downflow in each reactor.

In a more preferred embodiment, the process is carried out in at least 2 identical reactors operating in downflow, each comprising:

at the top of the reactor, a first zone of at least one catalytic bed of an hydrogenation catalyst, receiving a gas containing hydrogen, followed by a second zone of a direct oxidation catalyst bed, said bed being separated from the hydrogenation catalyst bed, comprising an internal cooling, preferably an embedded thermoplates heat exchanger, and between the first zone and the direct oxidation zone, and before entering in the direct oxidation zone, an injection of an oxygen-containing gas, said injection being activated only during the oxidation reaction, and the process operates as following:

the first reactor receiving the gas to be treated is at a temperature of 200-500° C. (called hot mode), the first hydrogenation reaction takes place in the first zone and the regeneration reaction takes place in the second zone, the gas withdrawn from the second zone of the first reactor entering in the first zone of the second reactor is at a temperature of 122 to 320° C. and the second hydrogenation step takes place, the gas from the first zone of the second reactor, optionally cooled, flows in the second zone of the second reactor where the direct oxidation takes place, the temperature is maintained at a temperature below the sulfur dew point (called cold mode), and a purified gas exits, prior to the deactivation of the oxidation catalyst of the second reactor, the gas steams are switched such that the second reactor becomes the first reactor operating in hot mode, and the first reactor becomes the second reactor operating in cold mode.

In this embodiment the reactors are identical, that means also that catalyst beds are identical (nature, quantity/volume, structure).

In a more preferred embodiment, a volume is designed between the first and second zone of each reactor, said volume being used to cool down the gas emanating from the hydrogenation zone prior contact with the direct oxidation catalyst.

This volume of the reactor is dedicated to get convenient gas temperature prior contacting the direct oxidation catalyst. Another means for cooling at the temperature required in the oxidation step can be employed: injection of cold oxygen-containing gas, increase of the circulation of coolant . . . . They are carried out and controlled such that the oxidation is selectively achieved.

Switching between the reactors is simple in the preferred embodiment with 2 similar reactors. Prior to the total deactivation of direct oxidation catalyst of the cold mode reactor, inlets and outlets of gases are changed such as the cold mode reactor switches to the hot mode and vice-versa. So, the gases to be treated enter with hydrogen in the previously cold mode reactor (now hot mode in the cycle) and reactions of hydrogenation and regeneration occur. The obtained gases, after sulfur separation, and oxygen addition, pass in the previously hot mode reactor (now cold mode reactor in the cycle) at a temperature below the dew point of sulfur, such that direct oxidation and sulfur adsorption occur.

We will not reproduce all the conditions directed to each step as previously described, obviously they apply to the schemes of the figures.

FIG. 1:

The feed (line 1) to the first reactor (I) comprises the gas to be treated, as tail gas from Claus unit, and H2.

Figure 1:
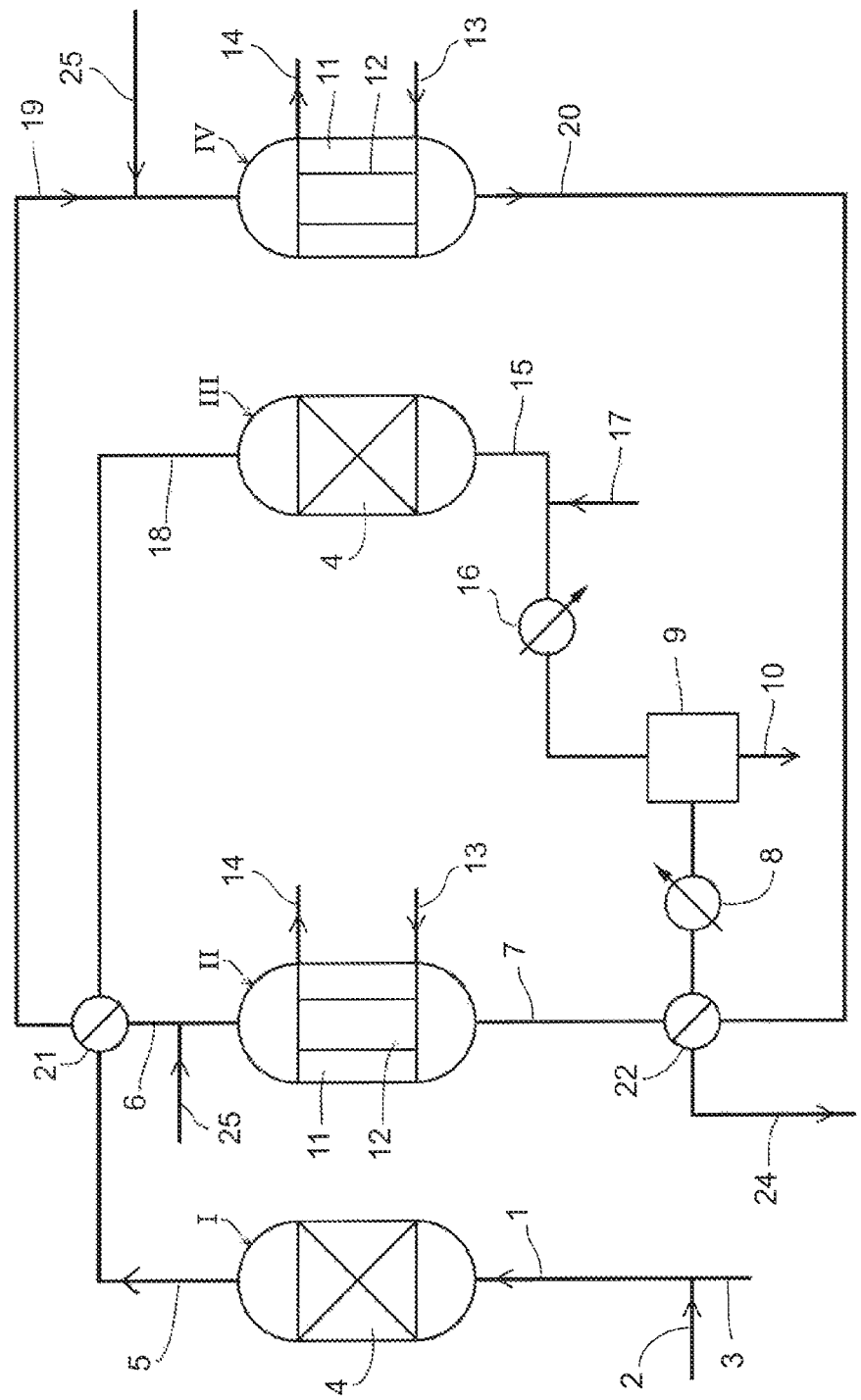
FIG. 1 represents the invention with 4 reactors (one for each catalyst).

In FIG. 1, H2 (line 2) coming from the utilities on the site or a H2 producing unit (reforming for example) is admixed with the gas to be treated (line3).

Figure 2:
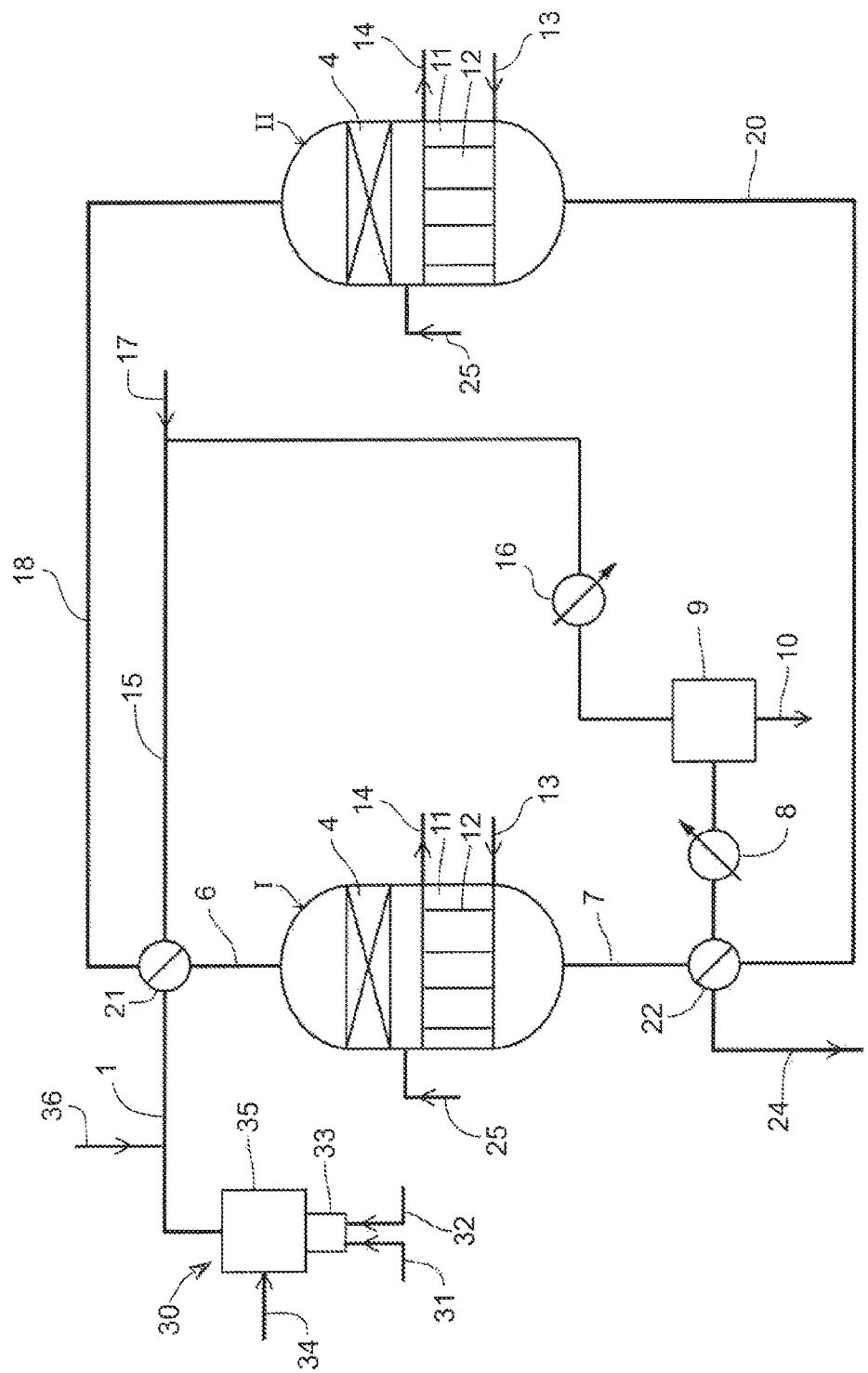
FIG. 2 represents the preferred embodiment with 2 identical reactors.

In FIG. 2, it will be seen that H2 is produced on-site by a reducing gas generator which will be described in FIG. 2, but it can be used for the embodiment of FIG. 1.

The feed enters at the top of the first reactor at a temperature preferably of 200-320° C. If necessary, it has been heated.

The first reactor (I) and the third reactor (III) contain at least one catalytic bed (4) of hydrogenation catalyst. It is a fixed bed of solid catalyst. The nature, quantity/volume of catalyst in each bed could be different. In FIG. 1, this catalytic bed does not include any cooling means. In reactors (I) and (III), respectively first and second hydrogenation step of sulfur species into H2S occur exothermally.

The second reactor (II) and the fourth reactor (IV) contain a catalytic bed (11) of a direct oxidation catalyst. It is a fixed bed of solid catalyst. Embedded in the catalyst is an internal heat exchanger (12) preferably made of thermoplates, in which a coolant can circulate (inlet line 13 and outlet line 14). In reactors (II) and (IV), respectively regeneration step and direct oxidation step are carried out. In both reactors an oxygen-containing gas can be injected; injection is activated for the oxidation reaction but deactivated for regeneration.

The hot gaseous effluent withdrawn (line 5) at the top of the first reactor (I), which is the gas issued from the first hydrogenation step, is then sent (line 6) to the second reactor (II). It is at a temperature above the sulfur dew point. Reactor (I) operates in hot mode.

In the second reactor (II) regeneration of the clogged oxidation catalytic bed occurs. The second reactor operates with coolant temperature adjusted to higher temperature and in the absence of oxygen injection (line 25 deactivated) in order to regenerate the oxidative catalyst bed. Reactor (II) operates in hot mode. Solid and/or liquid sulfur (accumulated from a previous cycle for which the catalyst of the reactor (II) worked in the oxidation reaction of H2S at sub dew point temperature) is delivered from catalyst and/or vaporized. The regeneration step of the catalyst (11) can lead to SO2 emanation.

The gas (line 7) issued from reactor (II) is enriched in sulfur and is cooled (cooler 8) at a temperature below sulfur dew point, in order for vaporized sulfur to be condensed (condenser 9) and liquid sulfur is separated (line 10) from the gas to be treated.

The gas to be treated is sent (line 15) to the third reactor (III) after optional heating (heater 16). Hydrogen can be added (line 17) if necessary. Hydrogenation of potential sulfur species issued from regeneration step into H2S can occur exothermally. That means that if sulfur species are present, hydrogenation takes place, if absent, gas passes through the hydrogenation catalytic bed without hydrogenation reaction. The feed (gas+H2) of the third reactor is at a temperature of 122-320° C.

The gas withdrawn (line 18) from the third reactor (III) is sent (line 19) to the fourth reactor (IV) where direct oxidation takes place, in the presence of an injection of an oxygen-containing gas (line 25 is activated) and with the coolant circulating in the internal heat exchanger (12) preferably made of thermoplates (inlet line 13 and outlet line 14 activated). Reactor (III) operates in cold mode.

The purified gas is withdrawn (line 20), then flows through the valve 22 and exits by line 24.

Prior to total deactivation of catalyst in the fourth reactor (IV), the bed is regenerated, by switching the inlet and outlet streams of the second reactor (II) and fourth reactor (IV) with valves (21) and (22), to proceed alternatively for each reactor to direct oxidize H2S together with sulfur accumulation, and then to regenerate the catalyst bed.

After switching, feed (1) passes in reactor (I), then is sent to reactor (IV) via line (5), valve (21), line (19) where regeneration takes place. The gas is sent to condenser (9) for sulfur separation via line (20), valve (22), cooler (8). The sulfur depleted gas, after optional heating, passes in reactor (III) and is transferred by line (18), valve 21 and line (6) to reactor (II) where it undergoes the oxidation reaction. The purified gas is withdrawn (line 24) after flowing through line (7) and valve (22).

FIG. 2:

The first reactor (I) and the second reactor (II) are identical. Each reactor contains at its top (where the feed enters) a first zone where the hydrogenation catalyst bed (4) is. The first zone is followed by a second zone where the direct oxidation catalyst (11) is where an internal heat exchanger (12) is embedded, with its inlet (13) and outlet (14) of coolant. The first zone does not necessarily contain any means of cooling, while the second zone request an internal heat exchanger.

Compared to FIG. 1, the first reactor of FIG. 2 includes the first and second reactors of FIG. 1 and the second reactor of FIG. 2 includes the third and fourth reactor of FIG. 1.

The catalysts and conditions . . . are the same as recited above, however in this embodiment, the gas flows downwardly in both reactors.

On this figure, H2 is produced on-site by a reducing gas generator here called RGG (30) in which a fuel as natural gas (line 31) with air (line 32) undergo combustion in sub-stoichiometric proportion by a burner (33), gases containing H2 and water are produced and mixed with the gas to be treated (line 34) in zone (35). If necessary, external H2 (line 36) can also be added to the stream to be treated. If necessary, the stream can be heated.

The feed (line 1) is sent (line 6) to the first reactor (first and second zones) at a high temperature of 200-320° C. (hot mode). In reactor (I) the first hydrogenation step is carried out in the first zone and the hot gas passes directly in the second zone where regeneration of the deactivated oxidation catalyst occurs. There is no injection of oxygen (line 25 deactivated). Reactor (I) operates in hot mode. The resulting gas is withdrawn (line 7), cooled (cooler 8) below the sulfur dew point so that liquid sulfur obtained from regeneration of catalyst (11) of second zone of first reactor, is condensed (condenser 9) and separated (line 10).

After optional heating (heater 16), and optional addition of hydrogen (line 17), the obtained gas (line 15) is sent (line 18) to the second reactor (II). Thereafter oxygen (line 25) is injected in between both zones of the second reactor and allows direct oxidation of H2S to occur in the second zone of the second reactor at sulfur sub dew point temperature. The second zone of reactor (II) operates in cold mode. The gas depleted in H2S is withdrawn (line 20).

Before the oxidation catalyst of the second zone of the second reactor is deactivated, reactors are switched by means of valves (21) and (22) as previously explained.

The invention presents the following advantages:

consideration of stream containing over 5000 ppm (expressed as H2S) of sulfur compounds, and preferably up to 15% vol., water addition is avoided and the temperature in the process is maintained above the temperature of water condensation, in the H2S oxidation step, the temperature is maintained low, so that SO2 production is substantially reduced, the performance of the process is independent of the H2S/SO2 ratio, and more, it is independent of the source of the gas to be treated.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. EP 15158886.0, filed Mar. 12, 2015 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for removal of sulfur compounds contained in a gas to be processed containing up to 15% volume of sulfur compounds expressed as $H_2S$, said process comprising:
   1) first hydrogenating of said sulfur compounds into $H_2S$, in the presence of hydrogen over an hydrogenation catalyst, the gas entering at a temperature of 200-320° C.,
   2) directly oxidating of $H_2S$ into elemental sulfur in the presence of oxygen over a bed of direct oxidation catalyst, at a controlled temperature below sulfur dew point, depositing elemental sulfur in the catalyst bed and obtaining a purified gas,
   3) regenerating of deactivated direct oxidation catalyst, regeneration being carried out in-situ by passage of a hot gas at a temperature above the sulfur dew point, then cooling gas obtained, condensing and separating of elemental sulfur, obtaining an elemental sulfur depleted gas and a regenerated catalyst, wherein regeneration is carried out by the passage of the hot gas issued from the first hydrogenation step,
   elemental sulfur depleted gas undergoes a second hydrogenation in the presence of hydrogen over an hydrogenation catalyst, the gas entering at a temperature of 122 to 320° C., and direct oxidation of the obtained gas.

2. The process according to claim 1 wherein the oxidation catalyst bed comprises an internal cooling for controlling the temperature.

3. The process according to claim 1 wherein the hydrogenation operates without cooling.

4. The process according to claim 1 carried out in:
   at least two separated direct oxidation zones in parallel, one (or several) being under reaction in a present cycle while deactivated catalyst is regenerated, said catalyst being issued from the zone previously under reaction in a previous cycle,
   the process operating as following successively:
   a) the feed (gas to be treated containing sulfur compounds+ $H_2$) undergoes a first hydrogenation of sulfur compounds into $H_2S$, in the presence of hydrogen over an hydrogenation catalyst, the gas entering at a temperature of 200-320° C.,
   b) regeneration of the direct oxidation catalyst deactivated in the previous cycle, said regeneration being carried out in-situ by the passage of the hot gas issued from the first hydrogenation, at a temperature above the sulfur dew point to desorb the sulfur, then cooling the obtained gas, condensation and separation of elemental sulfur, obtaining an elemental sulfur depleted gas and a regenerated catalyst,
   c) a second hydrogenation of elemental sulfur depleted gas in the presence of hydrogen over hydrogenation catalyst, the gas entering at a temperature of 122 to 320° C.,
   d) direct oxidation of $H_2S$ formed in the first and second hydrogenations into elemental sulfur in the presence of oxygen over a bed of direct oxidation catalyst, at a controlled temperature below the sulfur dew point, depositing elemental sulfur in the catalyst bed and obtaining a purified gas.

5. The process according to claim 1, carried out in at least 2 identical reactors operating in downflow, said reactors effecting a process comprising:
   at the top of each reactor, a first zone of at least one catalytic bed of an hydrogenation catalyst, receiving a gas containing hydrogen,
   followed by a second zone of a direct oxidation catalyst comprising an internal cooling,
   and between the first zone and the direct oxidation zone, and before entering in the direct oxidation zone, an injection of an oxygen-containing gas, said injection being activated only during the oxidation reaction,
   the first reactor receiving the gas to be treated is at a temperature of 200-500° C. (called hot mode), the first hydrogenation takes place in the first zone and the regeneration takes place in the second zone,
   the gas withdrawn from the second zone of the first reactor entering in the first zone of the second reactor is at a temperature of 122 to 320° C. and the second hydrogenation takes place,
   the gas from the first zone of the second reactor, optionally cooled, flows in the second zone of the second reactor where the temperature is maintained at a temperature below the sulfur dew point (called cold mode), and a purified gas exits,
   prior to the deactivation of the oxidation catalyst of the second reactor, the gas steams are switched such that the second reactor becomes the first reactor operating in hot mode, and the first reactor becomes the second reactor operating in cold mode.

6. The process according to claim 5 wherein a volume is designed between the first and second zone of each reactor, said volume being used to cool down the gas emanating from the hydrogenation zone prior contact with the direct oxidation catalyst.

7. The process according to claim 1 wherein the hydrogenation catalyst comprises a GVIII and a GVIB element deposited on alumina.

8. The process according to claim 1, wherein the direct oxidation catalyst is a catalyst comprising titanium oxide, a catalyst comprising Fe, CoMo or NiMo supported on titanium oxide, a catalyst comprising copper supported on titanium oxide or alumina, or a catalyst comprising an oxysulfide of a transition metal that is Fe, Cu, Ni, Cr, Mo or W, supported on silicium carbide.

9. The process according to claim 1, wherein the first hydrogenation operates in the presence of an excess of hydrogen of 1 to 5% vol. regarding to the total stoichiometric quantities of components to be hydrogenated, and the direct oxidation operates in the presence of an excess of oxygen of 0.1 to 4% vol. regarding to the stoichiometric quantity of components to be oxidized.

10. The process according to claim 1, wherein hydrogen is produced on-site by a reducing gas generator fed with natural gas and air in sub-stoichiometric quantity.

11. The process according to claim 1, wherein the direct oxidation in (2) is conducted at 20-180° C., and the regeneration in (3) is conducted at 200-500° C.

12. The process according to claim 2, wherein the oxidation catalyst bed comprises an internal heat exchanger as thermoplates heat exchanger embedded in the catalytic bed.

13. The process according to claim 4, wherein regeneration in (b) is conducted at 200-500° C., cooling is conducted at 122-170° C., and oxidation in (d) is conducted at 20-180° C.

* * * * *